E. E. JOHNSON.
MECHANICAL MOVEMENT.
APPLICATION FILED JUNE 14, 1919.

1,383,308.

Patented July 5, 1921.

Inventor:
Edward E. Johnson
By Whiteley and Ruckman
his Attorneys.

UNITED STATES PATENT OFFICE.

EDWARD E. JOHNSON, OF ST. PAUL, MINNESOTA.

MECHANICAL MOVEMENT.

1,383,308.   Specification of Letters Patent.   Patented July 5, 1921.

Application filed June 14, 1919. Serial No. 304,193.

*To all whom it may concern:*

Be it known that I, EDWARD E. JOHNSON, a citizen of the United States, residing at St. Paul, in the county of Ramsey and State of Minnesota, have invented certain new and useful Improvements in Mechanical Movements, of which the following is a specification.

My invention relates to mechanical movements and an object is to provide an efficient mechanism for converting rotary motion into a reciprocating motion of a plurality of connecting rods, or pitmen, operating in straight lines which are angularly related with respect to each other.

The full objects and advantages of my invention will appear in connection with the detailed description thereof and the novel features embodied in my inventive idea will be particularly pointed out in the claims.

Referring to the accompanying drawings which illustrate the application of my invention in one form,—

Figure 1:
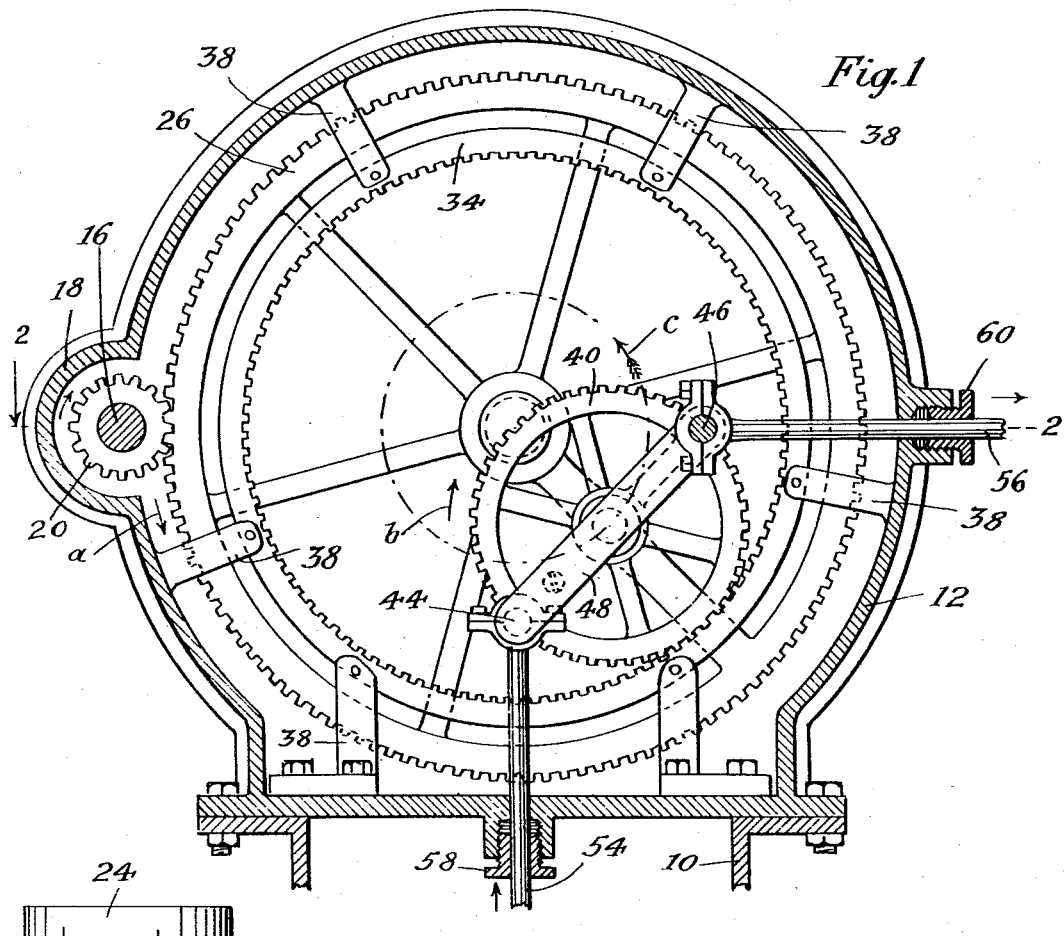
Figure 2:
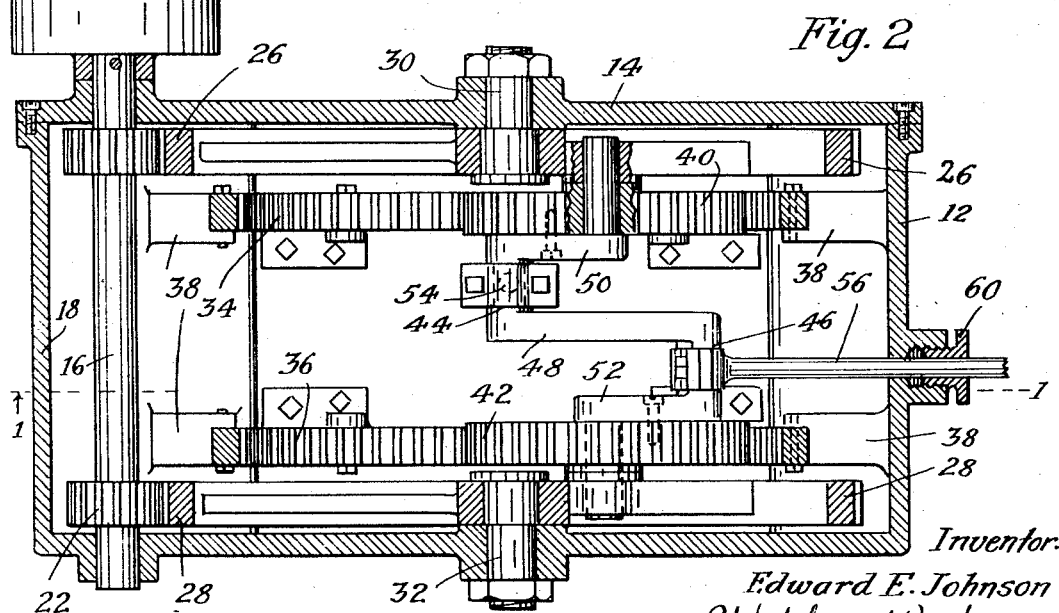

Figure 1 is a view in vertical section substantially on line 1—1 of Fig. 2. Fig. 2 is a view in horizontal section on the line 2—2 of Fig. 1.

Referring to the particular construction shown in the drawings, 10 designates a support to which is secured a casing 12 having a removable plate 14 at one end. At one side of the casing is journaled a transverse shaft 16, the casing being bulged out at 18 to accommodate this shaft and two pinions 20 and 22 secured thereto. A driving pulley 24, which may be driven from any suitable source of power, is secured to one end of the shaft 16. The pinions 20 and 22 mesh with gears 26 and 28 which are journaled on studs 30 and 32 secured in the casing, as shown in Fig. 2. Internal ring gears 34 and 36 are rigidly secured within the casing, preferably by lugs 38 extending from the inside of the wall of the casing. Spur gears 40 and 42 mesh with the internal gears 34 and 36 respectively and these spur gears are one-half the diameter of the internal gears. The gears 40 and 42 are journaled upon the gears 26 and 28 respectively between the center and peripheries of the gears 34 and 36. The gears 40 and 42 are connected by a crank member having crank pins 44 and 46 connected by a cheek 48 extending between the same at right angles thereto and the outer ends of the crank pins are provided with cheeks 50 and 52 secured to the gears 40 and 42 in such manner that the centers of the crank pins are located at the same radial distance as the pitch lines of the gears and these crank pins, being at opposite ends of the connecting portion 48, are located at one hundred and eighty degrees from each other. In operation the rotation of the gears 26 and 28 carries the gears 40 and 42 in an annular path, thereby rolling them around within the internal gears 34 and 36. Since the latter are within the diameter of the gears 40 and 42 the crank pins 44 and 46 reciprocate in straight lines which are diameters of the internal gears 34 and 36, one pin moving toward the center of the gear system while the other is moving away therefrom and vice versa. This operation may be readily seen from Fig. 1 in which the gear 26 is supposed to be rotating in the direction of the arrow "*a*." The gear 40 will be carried in an annular path in the same direction, but on account of being in mesh with the fixed internal gear 34 will be rotated on its axis in the direction of the arrow "*b*," so that while the center of gear 40 moves in a circle in the direction indicated by the arrow "*c*" the crank pin 44 moves back and forth in a straight line extending diametrically through the annular path. It is obvious that the crank pin 46 also has a straight line movement which is away from the center of the gear system at the time when the crank pin 44 moves toward the center and vice versa. A pitman, or connecting rod, 54 extends through a gland 58 in the bottom of the gear casing and at its inner end is journaled on the crank pin 44, while a pitman, or connecting rod, 56 extends through a gland 60 in the side of the gear casing and at its inner end is journaled on the crank pin 46.

It will be seen that the mechanical movement described above is adapted for self lubrication, and for the operation of pump cylinders for the compression of gases, or for pumping liquids, or for any purpose for which multiple reciprocating movements in sequence are required. While the device for illustrative purpose is shown as provided with two crank pins it is obvious that a greater number may be arranged in angular position around the peripheries of the spur gears and that all of the crank pins will move back and forth in diametral lines of the annular path, these various diametral lines being angularly disposed relatively to each other.

I claim:

1. A mechanical movement device comprising two external gears having their axes in alinement, means for rotating said external gears in unison, a fixed internal gear mounted with its center in alinement with the axes of said external gears, a spur gear carried in an annular path by said external gears, said spur gear meshing with said internal gear and having a diameter one-half that of said internal gear, crank pins secured to said spur gear at different angular positions with their centers at the same radial distance as the pitch line of said spur gear, and rods journaled on said crank pins for movement in diametral lines of said internal gear.

2. A mechanical movement device comprising two rotatable members mounted in spaced relation and axial alinement, means for rotating said members in step, a multiple throw crank shaft lying between said rotatable members and mounted eccentrically thereon for rotation, a spur gear having the same diameter as the crank strokes fixed on said crank shaft, a fixed internal gear of double the diameter of said spur gear and in mesh therewith, and rods journaled on said multiple throw crank for movement in diametral lines of said internal gear.

3. A mechanical movement device comprising two external gears mounted in spaced relation and having their axes in alinement, fixed internal gears mounted adjacent said external gears with their centers in alinement with the axes of said external gears, a multiple-throw crank-shaft lying between said external gears and mounted eccentrically thereon for rotation, spur gears having the same diameter as the crank strokes fixed on said crank-shaft and meshing with said internal gears, and rods journaled on said multiple-throw crank-shaft for movement in diametral lines of said internal gears.

In testimony whereof I hereunto affix my signature.

EDWARD E. JOHNSON.